July 14, 1959 W. BIRD 2,894,783
AUTOMOBILE HOUSE AND CAMPING TRAILER, AND
METHOD OF MANUFACTURING THE SAME
Filed Sept. 24, 1956 3 Sheets-Sheet 2

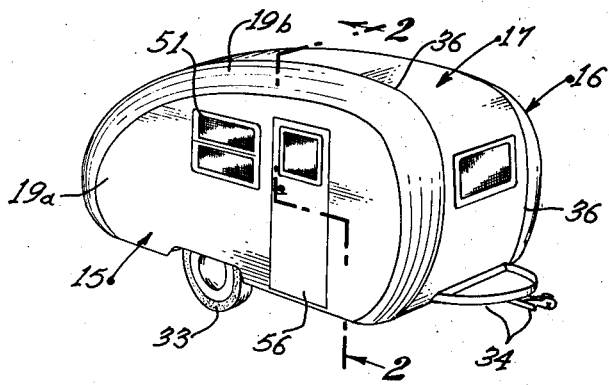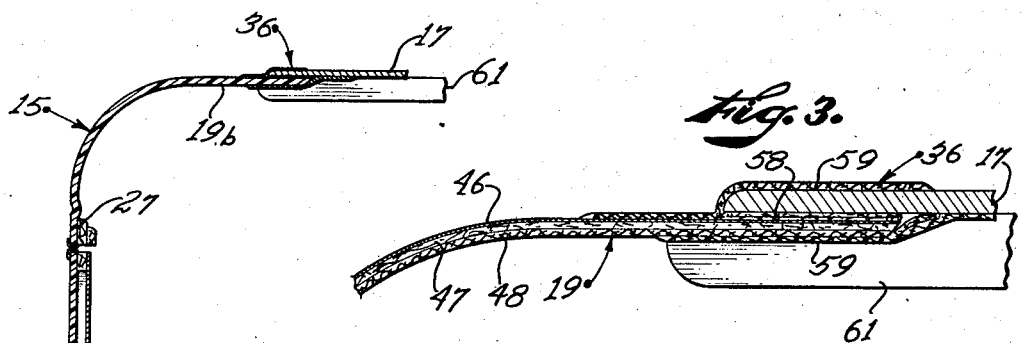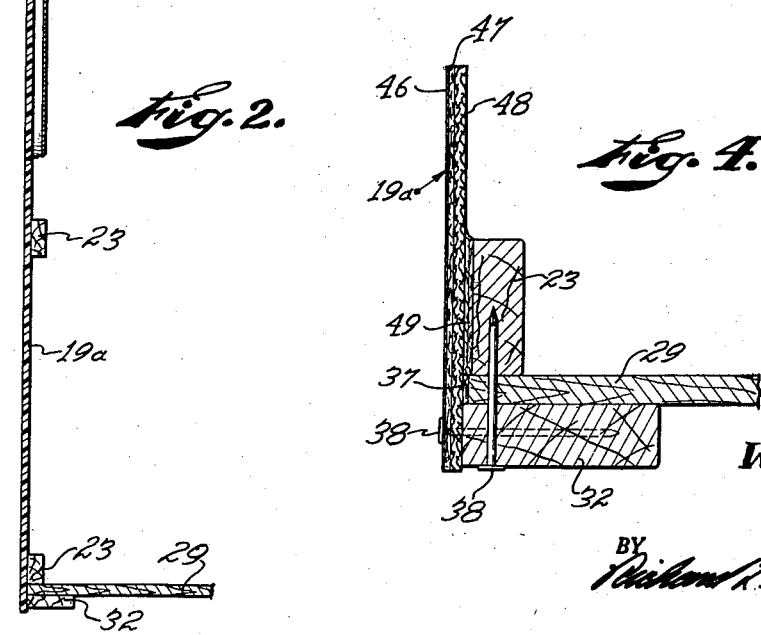

WALTER BIRD
INVENTOR.

BY
ATTORNEY

July 14, 1959
W. BIRD
2,894,783
AUTOMOBILE HOUSE AND CAMPING TRAILER, AND
METHOD OF MANUFACTURING THE SAME
Filed Sept. 24, 1956
3 Sheets-Sheet 3
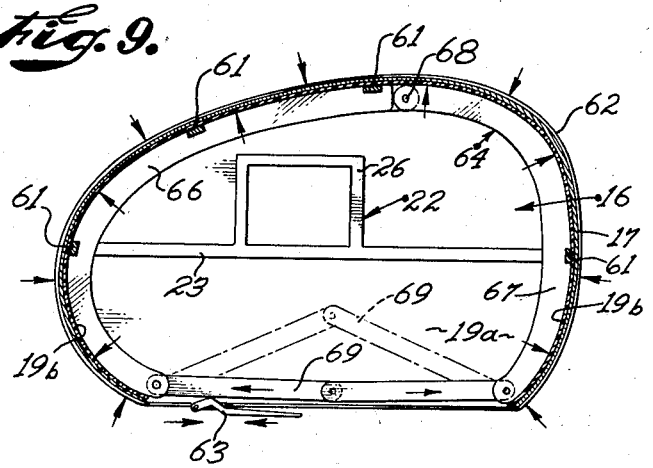
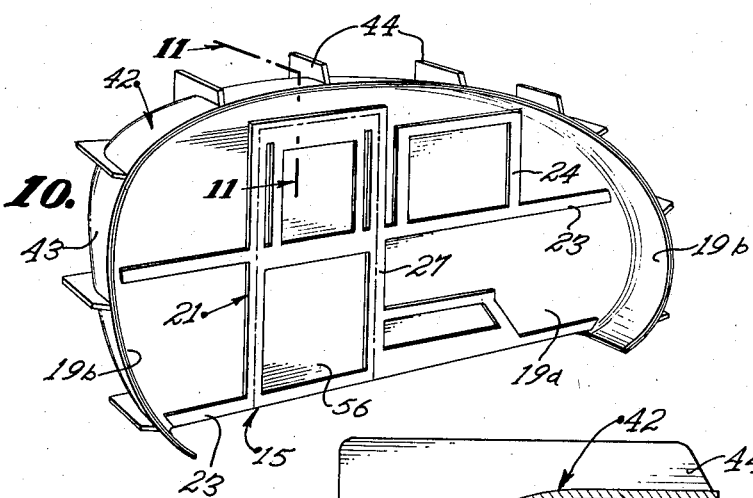
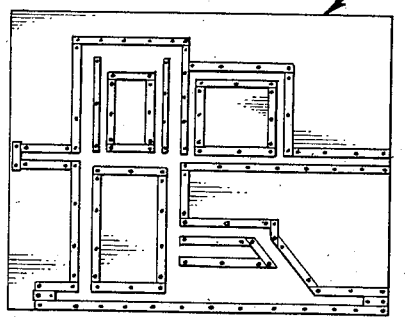
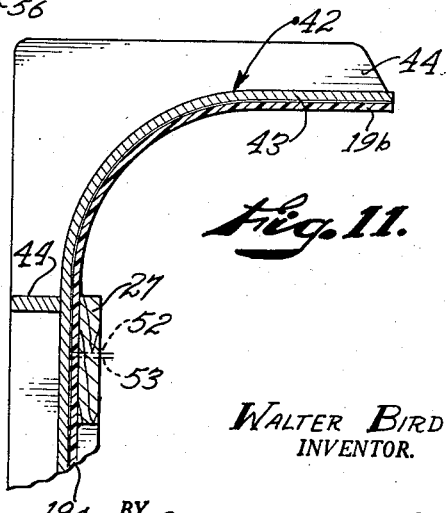
WALTER BIRD
INVENTOR.
BY
ATTORNEY

United States Patent Office 2,894,783
Patented July 14, 1959

2,894,783

AUTOMOBILE HOUSE AND CAMPING TRAILER, AND METHOD OF MANUFACTURING THE SAME

Walter Bird, Costa Mesa, Calif., assignor to William S. Correll, Costa Mesa, Calif.

Application September 24, 1956, Serial No. 611,471

1 Claim. (Cl. 296—23)

This invention relates to a house and camping trailer and to a method of manufacturing it. More particularly, the invention relates to a trailer formed in large part of molded glass fiber elements.

House and camping trailers presently manufactured are generally of aluminum and/or plywood construction, and are characterized by the presence of a very large number of joints, reinforcing elements, etc. Such trailers are relatively heavy and, because they are normally double walled, have relatively little interior room in comparison with their overall size. Additionally, trailers of the types indicated require very substantial amounts of painting, joint tightening and other maintenance work.

Because of the above very substantial deficiencies in trailers of the types indicated, it has been desired to construct a trailer of glass fiber elements. Glass fiber construction is characterized by extreme light weight, a minimum of maintenance work, and large and roomy interiors due to the fact that double walls are unnecessary. It has not, however, previously been known how to construct a glass fiber trailer which will be sufficiently strong for the purpose indicated, yet will be sufficiently economical to manufacture and sell in competition with wooden or metal trailers.

In view of the above factors, it is an object of the present invention to provide a trailer constructed largely of unitary molded glass fiber elements, and which is light in weight, economical to manufacture, attractive in appearance, strong in construction, and large in usable volume by comparison to its exterior dimensions.

A further object is to provide an automobile house and camping trailer comprising two unitary side sections of molded glass fiber construction, such side sections being joined adhesively to a single curved center section to provide a unitary shell having great strength and a minimum number of joints.

A further object is to provide a trailer incorporating molded glass fiber panels which are adhesively bonded to previously formed frame elements to provide an extremely rigid and attractive wall or side structure.

An additional object is to provide a method of manufacturing a trailer of molded glass fiber elements in combination with non-glass elements.

A further object is to provide a method of trailer manufacture including the steps of forming the door for the trailer as part of a molded glass fiber side section, and then cutting the door from the side section and supplying it with trim and hardware to complete the door structure.

These and other objects and advantages of the invention will be more fully set forth in the following specification and claim, considered in connection with the attached drawings to which they relate.

In the drawings:

Figure 1 is a perspective view of an automobile house and camping trailer constructed in accordance with the present invention;

Figure 2 is an enlarged fragmentary transverse vertical sectional view taken generally on the broken line 2—2 of Figure 1;

Figure 3 is an enlarged fragmentary sectional view of the longitudinal joint illustrated at the upper end of the showing of Figure 2;

Figure 4 is an enlarged fragmentary sectional view of the floor joint illustrated at the lower end of the showing of Figure 2;

Figure 9 is a longitudinal sectional view illustrating the apparatus employed for formation of the longitudinal joints, taken generally at line 9—9 of Figure 8;

Figure 10 illustrates one side section of the trailer during formation thereof in the mold therefor;

Figure 11 is an enlarged, fragmentary sectional view taken generally on line 11—11 of Figure 10; and Figure 12 is a plan view of the jig employed in assembling the frame elements for one side of the trailer.

Figure 7:
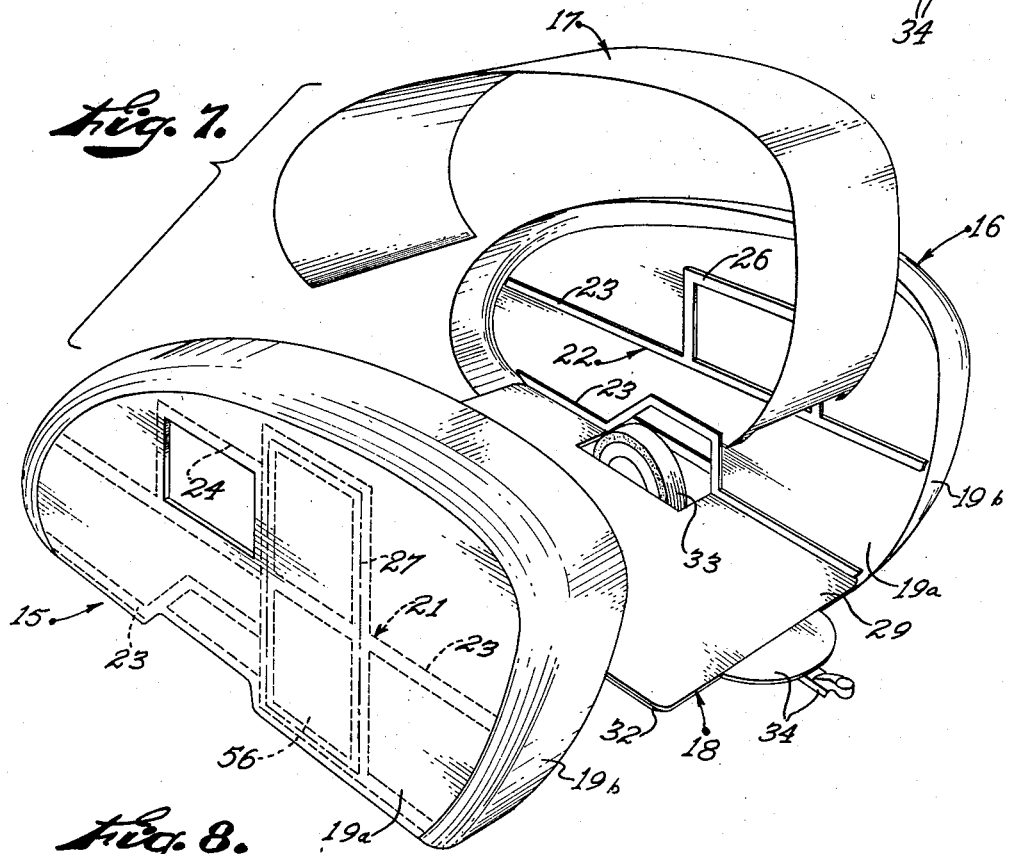
Figure 7 is an exploded perspective view of the principal components of the trailer.

Referring to the drawings, and particularly to Figures 1 and 7, the automobile house and camping trailer of the invention is illustrated to comprise left and right side sections 15 and 16, a center section 17, and floor and supporting means 18. It is to be understood that the trailer additionally includes interior cabinets, beds, trim, fixtures, etc., but none of these have been illustrated. Also, the wall openings for windows, etc., have not been illustrated except to the extent that they become material to the present invention.

The elongated side sections 15 and 16 comprise unitary molded glass fiber panels 19, which are identical except that they are left and right, in combination with wooden frame elements 21 and 22, the latter having identical portions but being dissimilar in part. As will be described in detail subsequently, the frames 21 and 22 are bonded to the respective glass fiber panels 19 of the left and right side sections 15 and 16.

Each glass fiber panel 19 includes a large area, generally vertical and flat side portion 19a which merges through a smooth curve with a smaller area roof or end portion 19b, the latter being perpendicular to the side portion. As best illustrated in Figure 10, the roof or end portion 19b terminates along the same horizontal plane, in general, as the lower edge of the associated side portion 19a, the result being a cut back or recess adapted to receive one edge of the floor and supporting means 18.

Both of the frames 21 and 22 for side sections 15 and 16, respectively, include longitudinal brace elements 23 disposed in vertically spaced horizontal relationship (Figure 7). The lower brace element 23 for each side section jogs upwardly, at its central portion, to provide supporting structure for a wheel well, not shown. The upper brace elements 23 form the lower sides of window frames 24 and 26, respectively. The frame 21 for left side section 15 additionally includes door frame components 27 the construction of which will be described in detail hereinafter. Both of the frames 21 and 22 are formed in jigs, being nailed or otherwise assembled prior to bonding to the respective glass fiber panels 19. One such jig, for the frame construction 21, is illustrated as 28 in Figure 12.

The center section 17 comprises a single sheet of fiberboard which is curved to correspond to the curvature of side sections 15 and 16 (Figure 7). A suitable fiberboard is sold under the trademark "Masonite." As illustrated, the center section 17 and the corresponding roof or end portions 19b of side sections 15 and 16, when viewed in longitudinal section (Figure 9), are continuously curved and are generally oblong or obloid (egg-shaped) except that the bottom is flat where the floor and supporting means 18 are connected.

Figure 5:
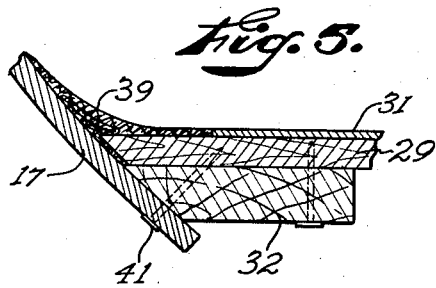
Figure 5 is an enlarged, fragmentary, longitudinal central sectional view illustrating a floor joint at the rear of the trailer, such joint being between the floor elements and the rear trailer wall elements.
Figure 6:
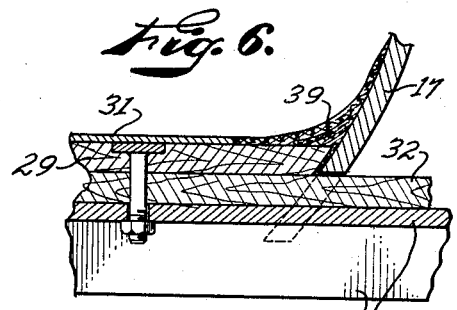
Figure 6 is an enlarged, fragmentary, longitudinal, central sectional view illustrating a floor joint between the floor elements and the wall elements at the forward or front end of the trailer.

The floor and supporting means 18 comprises a flat floor sheet or element 29, preferably formed of plywood, which may be covered with linoleum as indicated at 31 in Figures 5 and 6. The underside of the floor sheet 29 is braced by metal and wooden braces, some such braces being indicated at 32. The side portions of the floor sheet are recessed or cut back to receive the wheels 33, the latter being journaled on a suitable axle member, not shown. A metal tongue and support pan structure, bearing the reference numeral 34, is suitably bolted or otherwise secured to the floor sheet 29 and brace elements therefor.

The longitudinal, curved joints between the edges of center section 17 and the edges of portions 19b of the glass fiber panels have been given the reference number 36, and will be described in detail subsequently. These joints are made before making of the joints between the floor structure and the lower portions of the side and center sections 15–17. The latter joints, which may be referred to as the floor joints, are shown in detail in Figures 4–6.

Referring first to Figure 4, there is illustrated the floor joint between a panel side portion 19a and an edge of floor sheet 29. This joint is made by inserting one edge of floor sheet 29 beneath the lower longitudinal brace element 23, the latter having been bonded to side portion 19a as will be described below. The edge of the floor sheet is then bonded, by means of matting and polyester resin indicated at 37, to the side portion 19a. Nails or other fasteners 38 are then inserted at right angles to each other and into brace elements 23 and also into a brace 32, which provides an extremely strong joint. Trim or molding, preferably formed of aluminum and not shown herein, is then applied over the lower corner of the floor joint to provide a decorative appearance.

Figures 5 and 6 illustrate, respectively, the floor joints at the rear and front of the trailer. These joints are the same whether they are between the floor and the center section 17, or between the floor and the lower ends of panel end portions 19b. Such joints are made by bevelling the edges of the floor sheet 29, and adjacent supporting elements 32, to correspond to the curvature of the center section 17 (or end portions 19b) at the point in question. Adhesive bonds are then made by inserting matting 39, saturated with polyester resin, in the intersections of the floor sheet 29 and end elements. The saturated matting 39 not only effects an extremely strong bond but also provides an interior fillet which makes it easy to maintain the interior of the trailer clean. Suitable nails 41 or other fasteners are then inserted through the connected elements to increase the strength of the joints, countersinking and similar techniques being employed to provide a decorative exterior appearance. It is to be understood that the end of center section 17 over the pan 34 is slightly recessed, and the floor joint thereat correspondingly modified.

*Method of manufacture, and detailed description of materials employed and of longitudinal joints 36*

In carrying out the method of the invention, the glass fiber panels 19 are first formed in molds, one such mold being indicated at 42 in Figures 10 and 11. Each mold comprises a continuous sheet of metal 43, preferably aluminum or stainless steel, which is rigidly supported by braces 44. To form a glass fiber panel, the inner surface of the female mold sheet 43 is first waxed and then sprayed with a suitable parting compound or liquid. After the parting compound has dried, a pigmented polyester resin is sprayed on, and allowed to become semi hard. A coat of clear polyester resin is then brushed on, and one or more glass fiber mats are applied. One or more layers of glass cloth (textile) are then applied over the mats, and the mats and cloth are saturated with clear polyester resin by means of a brush and squeegee. A frame element 21 or 22, as the case may be, is then covered on its inner side with matting which has been saturated with polyester resin, and is pressed against the saturated glass cloth while the latter is still wet. Pressure is then applied by means, not shown, until the entire mass has become hard.

Referring to Figures 3 and 4, the pigmented resin is indicated at 46, the matting and resin at 47, and the glass fiber cloth and resin at 48. The matting and resin between the frame 21 and 22 and the glass fiber cloth 48 is indicated at 49 in Figure 4. The polyester resin is representative of several thermosetting synthetic bonding resins which may be employed.

After the side sections 15 and 16 have completely set and dried, and have been removed from their molds, holes are cut within the window frames 24 and 26 in order to provide openings for metal and glass window elements such as are indicated at 51 in Figure 1. Two parallel saw cuts are then made in approximately the central portion of door frame 27, and along lines spaced a slight clearance distance from each other as indicated at 52 and 53 in Figure 11. Such saw cuts are through not only the frame, but also the panel side portion 19a of the left side section 15. The result is the formation of a glass fiber and plastic door 56 having a reinforcing frame rigidly bonded thereto. After such door is trimmed and mounted by hinges and other suitable hardware, it is extremely decorative, lightweight and accurately fitting.

The side sections 15 and 16 having been formed as described above, they are moved to points adjacent opposite edges of the floor and support means 18 as illustrated in Figure 7. The center section 17 is then mounted therebetween, being supported upon a suitable scaffold 57 shown in Figure 8. It is to be understood that the side sections 15 and 16 are also supported by suitable means, not shown. The edges of the center section 17 are lapped over the edges of portions 19b of the side sections, and matting 58 saturated with polyester resin is provided therebetween. Glass fiber strips 59 (Figure 3), saturated with polyester resin, are mounted on the outer and inner surfaces of each lapped longitudinal joint 36, and the gaps at the edges of the various elements are filled with saturated matting so that no sharp corners are formed. Transverse brace and connector elements 61, formed of wood, are extended between the longitudinal joints 36 at opposite sides of the trailer, and in the spaced relationship indicated in Figure 9. The elements 61 are bonded to the joints and to the center section 17, and may be otherwise secured thereto by suitable fasteners, not shown.

Figure 8:
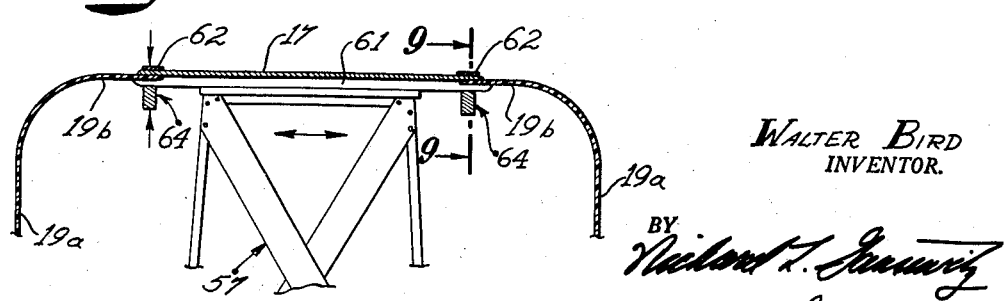
Figure 8 is a transverse sectional view illustrating the upper portions of the side and central sections of the trailer during formation of the longitudinal joints therebetween.

A showing of the strips 59, etc., for joints 36 has been omitted from Figures 8 and 9, for purposes of simplicity of illustration.

Before the resin has set in the strips 59 and matting 58, means are provided to apply pressure along the full length of each longitudinal joint 36. Such means are illustrated in Figure 9 as comprising an encircling strap 62, adapted to be held tight by a buckle 63, and a pivoted inner frame 64. The inner frame comprises two curved components 66 and 67 which are suitably notched to receive the connectors 61, and are hinged together at 68. A toggle linkage 69 connects the lower ends of the curved components 66 and 67, the result being that when the toggle linkage is extended the components 66 and 67 will be pivoted outwardly to squeeze the lapped joint elements against the encircling strap 62.

From the above it will be understood that, after the resin in the longitudinal joints 36 has set, very rigid connections will be formed between the elements 17 and 19b. No double-walled construction is thus necessary, as is conventional in trailer constructions, which results in very greatly increased head room and space inside the trailer.

The floor joints with floor means 18 are then formed, as previously described in detail in connection with Figures 4, 5, and 6, and the completed trailer shell results. Thereafter, as previously indicated, finishing operations are performed by applying trim, interior cabinets and beds, wheel wells and braces, etc.

Various embodiments of the present invention, in addition to what has been illustrated and described in detail, may be employed without departing from the scope of the accompanying claim.

I claim:

A relatively small house and camping trailer for towing behind an automobile or other motor vehicle, which comprises left and right obloid panels each formed of fibers and synthetic bonding resin, each of said panels comprising at least a complete side of the trailer, each of said panels having a relatively large, inwardly-extending edge portion which extends in a continuous obloid curve around the entire panel except at the lower portion thereof, the extreme ends of said continuously curved edge portions being gradually return-bent so as to converge downwardly, each of said edge portions having a rim which merges through a smooth, large-radius curve with the generally vertical side portion of the associated panel, a center section comprising at least one relatively long, generally rectangular sheet or strip of sheeting having sufficient flexibility to permit bending thereof into the shape of said rims of said edge portions and having sufficient stiffness and rigidity to maintain a relatively firm and supporting connection between said panels, said sheet or strip extending longitudinally of the trailer, said center section forming both the central portion of the roof of said trailer and the central portions of both ends of said trailer, joint means connecting the longitudinal side edges of said center section to said rims of said edge portions and in sealing relationship, a floor element disposed at the lower portions of said panels and over the downwardly-convergent ends of said center section, floor joint means to secure said panels and said center section to said floor element, and wheel means to support said floor element.

References Cited in the file of this patent

UNITED STATES PATENTS

| | | |
|---|---|---|
| 1,814,556 | Jewett | July 14, 1931 |
| 2,235,662 | Arehart | Mar. 18, 1941 |
| 2,459,765 | Black | Jan. 18, 1949 |

FOREIGN PATENTS

| | | |
|---|---|---|
| 379,379 | Germany | Aug. 20, 1923 |
| 285,743 | Great Britain | Feb. 23, 1928 |

OTHER REFERENCES

Article, "How This Trailer Builder Treats Employees," in "Autobody" magazine of June 1936, page 39.

"Aircraft to Caravans," in "Autocar" magazine, June 28, 1946, page 553.

"Fleet Built Plastic Bodies," in "Commercial Car Journal," February 1954, pages 82, 83, 130 and 131.

"Low Pressure Laminates," in "Automobile Engineer," December 1953, pages 541–549.